United States Patent [19]
Ito

[11] Patent Number: 4,839,791
[45] Date of Patent: Jun. 13, 1989

[54] INPUT/OUTPUT BUFFER SYSTEM

[75] Inventor: Koichi Ito, Tokyo, Japan

[73] Assignee: NEC Corporation, Tokyo, Japan

[21] Appl. No.: 23,620

[22] Filed: Mar. 9, 1987

[30] Foreign Application Priority Data

Mar. 8, 1986 [JP] Japan .................................. 61-50932

[51] Int. Cl.⁴ ........................................... G06F 13/00
[52] U.S. Cl. ................................. 364/200; 364/239.7; 364/241.9
[58] Field of Search ... 364/200 MS File, 900 MS File

[56] References Cited

U.S. PATENT DOCUMENTS

| | | | |
|---|---|---|---|
| 4,056,843 | 11/1977 | Bishop et al. | 364/200 |
| 4,126,897 | 11/1978 | Capowski et al. | 364/200 |
| 4,258,418 | 3/1981 | Heath et al. | 364/200 |
| 4,407,016 | 9/1983 | Bayliss et al. | 364/200 |
| 4,598,357 | 7/1986 | Swenson et al. | 364/200 |

Primary Examiner—Gareth D. Shaw
Assistant Examiner—Debra A. Chun
Attorney, Agent, or Firm—Foley & Lardner, Schwartz, Jeffery, Schwaab, Mack, Blumenthal & Evans

[57] ABSTRACT

An input/output buffer system includes: a buffer memory connected between a main memory and an input-/output processing unit having a plurality of physical channels, the buffer memory comprising an address area and a data area, the address and data areas being assigned to current physical channels; a register for storing start positions and capacities of the areas to be assigned to the physical channels of the buffer memory and information in units of physical channels, the information representing relative values of data write and read positions of the buffer memory with respect to the start positions of the areas; a combination of a firmware write bus, a firmware channel number register and a selector for presenting in the register the start positions and capacities of the areas assigned to the physical channels of the buffer memory once when the input-/output system is started up or modified; and logic circuits for generating the write and read position signals for the buffer memory on the basis of the information stored in the register and for supplying the signals to the buffer memory.

5 Claims, 6 Drawing Sheets

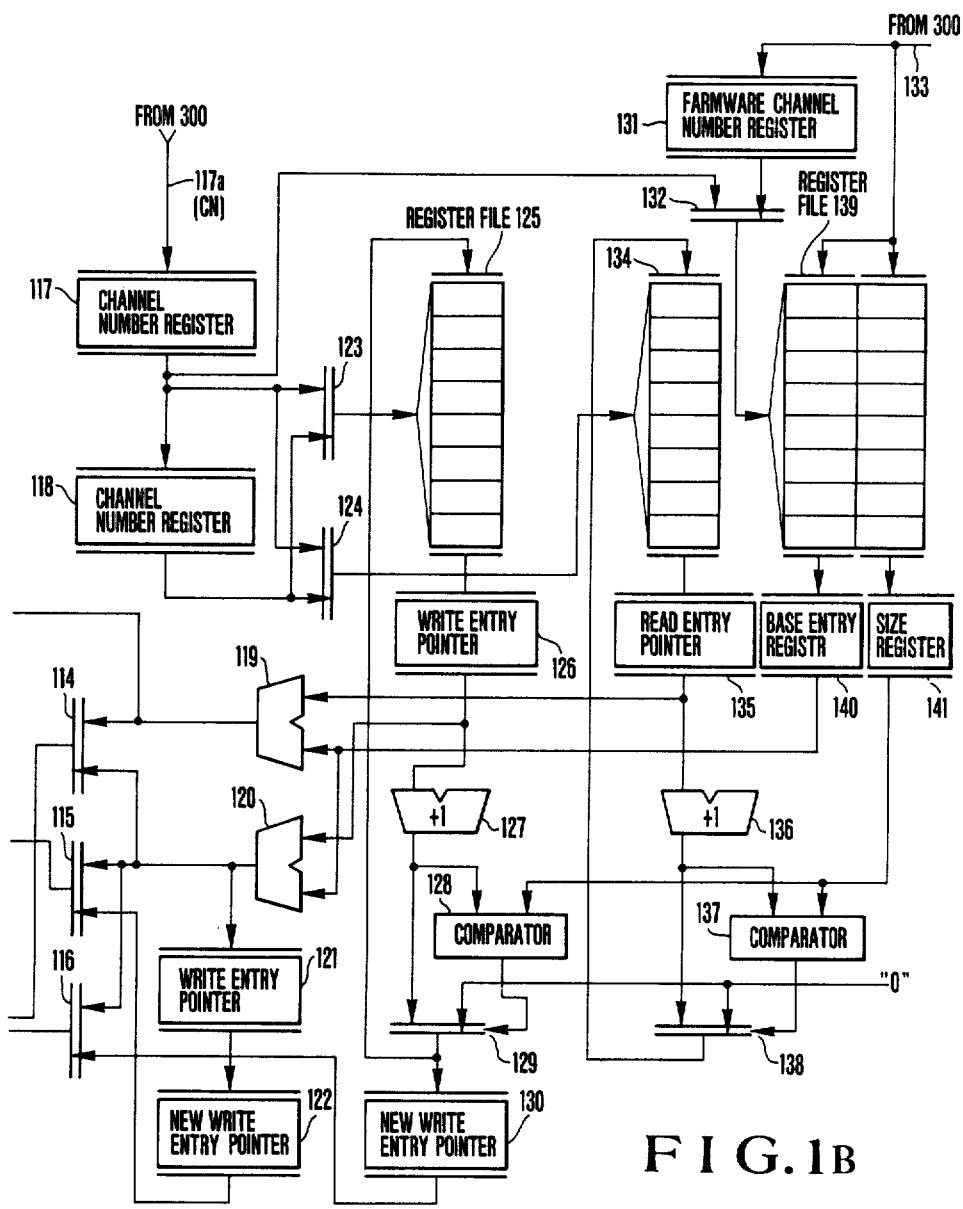
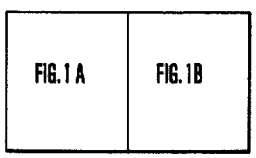
FIG. 1
FIG. 1B

FIG. 2
(PRIOR ART)

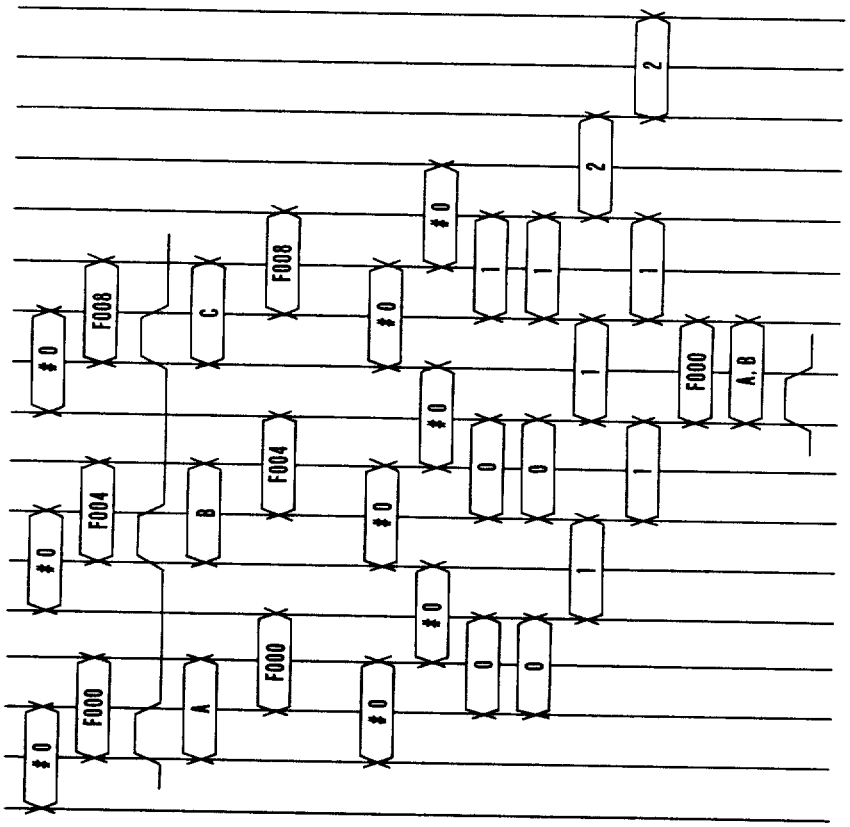

INPUT/OUTPUT BUFFER SYSTEM

BACKGROUND OF THE INVENTION

The present invention relates to an input/output buffer system having a novel buffer area allocation system.

A conventional computer system includes a buffer memory between an input/output device and a main memory of a processor to temporarily store a required number of data signals. Conventional buffer systems include a fixed length buffer system and a variable length buffer system. The latter system is developed to eliminate the disadvantages of the former system.

A conventional variable length buffer system is disclosed in U.S.P. No. 4,258,418 (Mar. 24, 1981). This system aims at dynamically adjusting the size or capacity of a buffer memory so as to minimize buffer filling delay and I/O device start/stop delay. In this buffer system, the buffer memory has a maximum data storage capacity value and is controlled by software to selectively establish a threshold storage capacity value which is less than the maximum storage capacity value of the buffer memory. According to this buffer system, when data is transferred between a processor and a low-speed I/O device, the threshold storage capacity value can be small, and most of the capacity of the buffer memory need not be used. In addition, since a single I/O device occupies a buffer memory for a predetermined period of time (e.g., time required for transferring one-block data), it is impossible to transfer multiplexed data between the processor and a plurality of I/O devices.

In order to set the threshold value by software, attributes of the I/O device must be recognized before initialization thereof, thus overloading the processor.

In the prior art as described above, even if the threshold value is small, all buffer areas are sequentially used. Even if a failure occurs in some of the buffer areas, the failed areas cannot be disconnected.

SUMMARY OF THE INVENTION

It is an object of the present invention to eliminate the conventional disadvantage and provide an input/output buffer system capable of eliminating nonused areas of a buffer memory and allowing multiplex operation with a plurality of I/O devices.

It is another object of the present invention to provide an input/output buffer system wherein the threshold value is set once when the system is started up or initialized by firmware without setting the threshold value by software whenever it is required, thereby decreasing the load of the processor.

It is still another object of the present invention to provide an input/output buffer system wherein a failed area of the buffer memory can be disconnected if a failure occurs and the remaining areas of the buffer memory can be normally used.

In order to achieve the above objects of the present invention, there is provided an input/output buffer system comprising: a buffer memory connected between a main memory and an input/output processing unit having a plurality of physical channels, the buffer memory comprising an address area and a data area, the address and data areas being assigned to current physical channels; memory means for storing start positions and capacities of the areas to be assigned to the physical channels of the buffer memory and information representing relative values of data write and read positions of the buffer memory with respect to the start positions of the areas; means for presetting in the memory means the start positions and capacities of the areas assigned to the physical channels of the buffer memory once when the input/output system is started up or modified; and logic circuits for generating the write and read position signals for the buffer memory on the basis of the information stored in the memory means and for supplying the signals to the buffer memory.

BRIEF DESCRIPTION OF THE DRAWINGS

Figure 2:
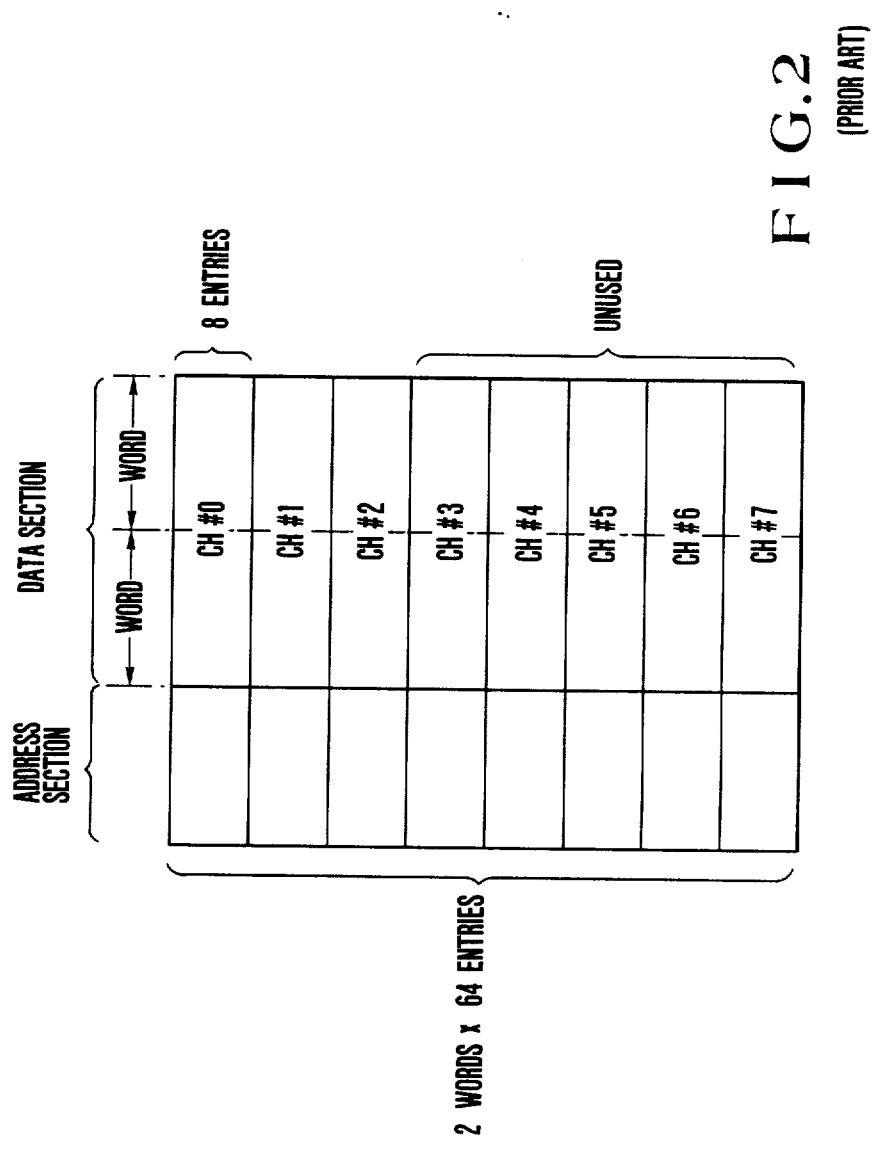

FIG. 2 is a memory map for explaining a conventional memory allocation scheme of the buffer memory;

FIGS. 4 and 5 are charts for explaining the temporal relationships between the signals in FIG. 1.

DETAILED DESCRIPTION OF THE PREFERRED EMBODIMENT

The present invention will be described in detail with reference to the accompanying drawings.

Figure 1A:
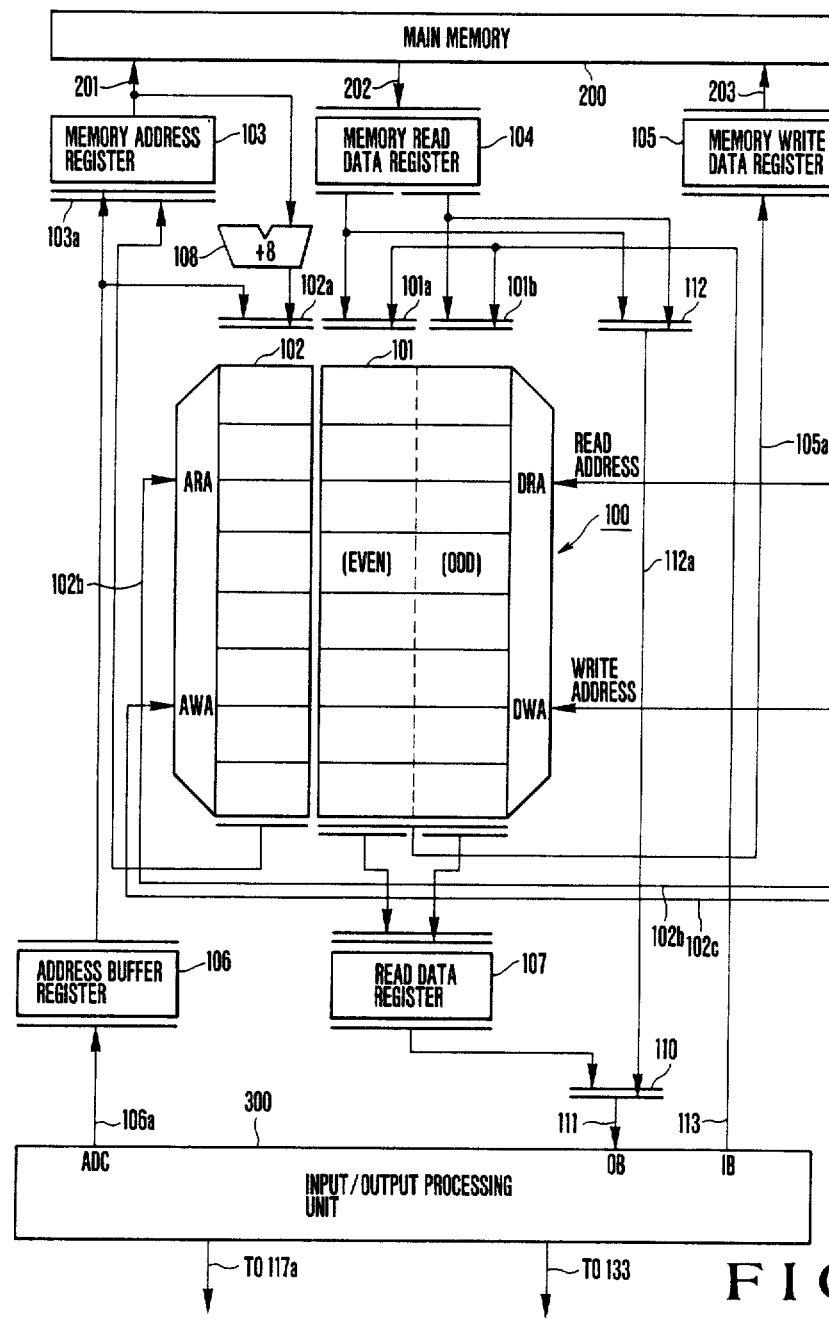
FIG. 1, consisting of FIGS. 1A and 1B, is a block diagram showing an input/output buffer system according to an embodiment of the present invention.

Referring to FIG. 1, the input/output buffer system is arranged between a main memory 200 and an input/output processing unit 300. In this embodiment, the physical channels are eight channels #0 to #7. The input-/output devices are a magnetic disk device, a magnetic tape device, and a unit record processing device (for controlling a line printer, a CRT or the like). These input/output devices are connected to physical channels #0, #1, and #2, respectively. Channels #3 to #7 are not used.

The buffer system includes a buffer memory 100 having a capacity of 64 entries each consisting of two words. In the conventional buffer system, eight entries are assigned to each physical channel. If the physical channels are channels #0 to #2, the data areas assigned to to physical channels #3 to #7 are not used. Utilization efficiency of the buffer memory 100 is degraded.

Figure 3:
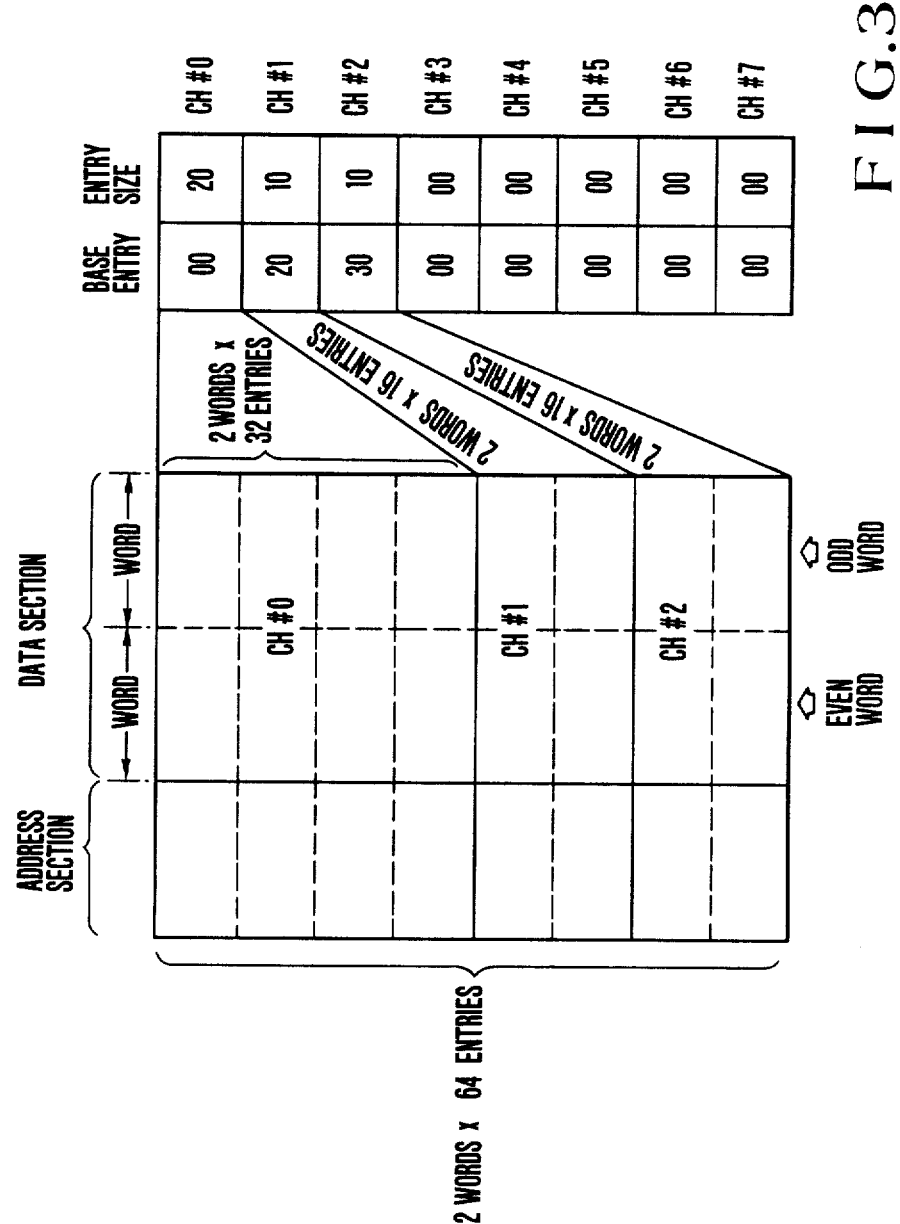
FIG. 3 is a memory map for explaining a memory allocation scheme of the buffer memory according to the present invention.

According to the present invention, as shown in FIG. 3, 32 entries are assigned to physical channel #0, and 16 entries are assigned to each of physical channels #1 and #2.

Referring to FIG. 1, the buffer memory 100 comprises a data area 101 and an address area 102 for temporarily storing address signals for the main memory 200. The input terminal of the address area 102 is connected to the output terminal of a selector 102a. One input terminal of the selector 102a is connected to an address bus 201 of the main memory 200 through an adder 108 for adding 8. The other input terminal of the selector 102a is connected to one input terminal of a selector 103a and to the address bus 201 through a memory address register 103. At the same time, the other input terminal of the selector 102a is connected to an address buffer register 106 and to an address counter ADC in the input/output processing unit 300 through a line 106a. The output terminal of the address area 102 is connected to the other input terminal of the selector 103a and to the address bus 201 through the memory address register 103. A signal associated with address read operation is supplied from the output terminal to a read address terminal ARA of the address area through a line 102b. A signal associated with an address write operation is supplied from the output terminal of a selector 116 to a write address terminal AWA through a line 102c.

The data area is divided into odd- and even-numbered word areas, and each entry therein consists of two words. Referring to FIG. 1, the area to the left of the broken line represents the even-numbered word area, and the area to the right of the broken line represents the odd-numbered word area. Each input terminal of the even-and odd-numbered word areas is connected through one input terminal of each of selectors 101a and 101b to a corresponding one of the output terminals of a memory read data register 104 the input terminal of which is connected to a data read line 202 of the main memory 200. The other input terminal of each of the selectors 101a and 101b is connected to an input buffer register IB in the input/output processing unit 300 through a line 113. Each of the output terminals of the even- and odd-numbered word areas in the data area 101 is selectively connected to one of the input terminals of the read data register 107. The output terminal of the read data register 107 is connected to one input terminal of a selector 110 and to an output buffer register OB in the input/output processing unit 300 through a line 111. An output consisting of even- and odd-numbered words is connected from the data area to the input terminal of a memory write data register 105 through a line 105a. The output terminal of the memory write data register 105 is connected to a write line 203 of the main memory 200.

The output terminals of the memory read data register 104 are connected in parallel with the buffer memory 100, and are connected to an output buffer register OB in the input/output processing unit 300 through a selector 112, a line 112a, the other input terminal of the selector 110, and the line 111. A signal designating a data write address for the data area 101 is supplied from the output terminal of a selector 115, and a signal representing a data read address is supplied from the output terminal of an adder 119 to a read address terminal DWA.

A signal including a channel number CN is supplied from the input/output processig unit 300 to a channel number register 117 through a line 117a. The output terminal of the channel number register 117 is connected to a channel number register 118 and one input terminal of each of selectors 123 and 124 and to one input terminal of a selector 132. The other input terminal of each of the selectors 123 and 124 is connected to the output terminal of the channel number register 118. Outputs from the selectors 123 and 124 are supplied to a register file 125 for storing a write relative entry and a register file 134 for storing a read relative entry, respectively. Each of register files 125 and 134 consists of registers corresponding to eight channels, i.e., physical channels #0 to #7. The output terminals of the register files 125 and 134 are respectively connected to the input terminals of a write entry pointer 126 and a read entry pointer 135. The output terminal of the write entry pointer 126 is connected to one input terminal of an adder 120 and the input terminal of an adder 127 for incrementing the input by one. The output terminal of the read entry pointer 135 is connected to one input terminal of an adder 119 and the input terminal of an adder 136 for incrementing the input by one. The output terminal of the adder 127 is connected to one input terminal of each of a comparator 128 and a selector 129. The comparator 128 compares the output from the adder 127 with an output from a size register 141 to be described later. When a coincidence between the outputs from the adder 127 and the size register 141 is established, the comparator 128 supplies a control signal to the selector 129 such that the selector 129 selects "0". An output from the selector 129 is written in the register file 125 and at the same time is supplied to a new write entry pointer 130. An output from the new write entry pointer 130 is supplied to one input terminal of the selector 116. An output from the adder 136 is supplied to a comparator 137 for comparing it with an output from the size register 141 and to a selector 138. When both inputs to the comparator 137 coincide with each other, the comparator 137 causes the selector 138 to output '0'. An output from the selector 138 is written in the register file 134.

A register file 139 is a component having a characteristic feature according to the present invention. The register file 139 stores, in units of physical channels, a start entry and an entry size of the buffer area of the buffer memory 100 which are assigned to each physical channel. The contents of the register file 139 is updated by the input/output processing unit 300 through a firmware wire bus 133 when the system is started up or modified. The firmware write bus 133 is connected to the input terminal of a firmware channel number register 131. The output terminal of the firmware channel number register 131 is connected to the other input terminal of the selector 132. An output from the selector 132 is supplied as a channel selection signal to the register file 139. An area for storing the start entry is connected to the input terminal of a base entry register 140. An area for storing the entry size in the register file 139 is connected to the input terminal of the size register 141.

An output from the base entry register 140 is connected to the other input terminal of each of the adders 119 and 120. More specifically, the adder 119 adds the start entry and a read relative entry. The sum from the adder 119 is supplied to one input terminal of the selector 114 and the data read address terminal DRA in the data area 101. The adder 120 adds the start entry and a write relative entry. A sum from the adder 120 is supplied to the other input terminal of each of the selectors 114 and 116, one input terminal of the selector 115, and the input terminal of the write entry register 121. The output terminal of the write entry pointer 121 is connected to the other input terminal of the selector 115 through the new write entry pointer 121.

The operation of the input/output buffer system shown in FIG. 1 will now be described.

The input/output processing unit 300 performs memory 100 allocation on the basis of the number of existing physical channels and the diagnosis results after the initialization diagnosis. Assume that there are three physical channels, as shown in FIG. 3. A magnetic disk device is connected to physical channel #0, a magnetic tape device is connected to physical channel #1, and a unit record processing device for controlling a line printer or a CRT is connected to physical channel #2.

(1) Output Data Transfer (Magnetic Disk Device for Physical Channel #0)

Figure 4:
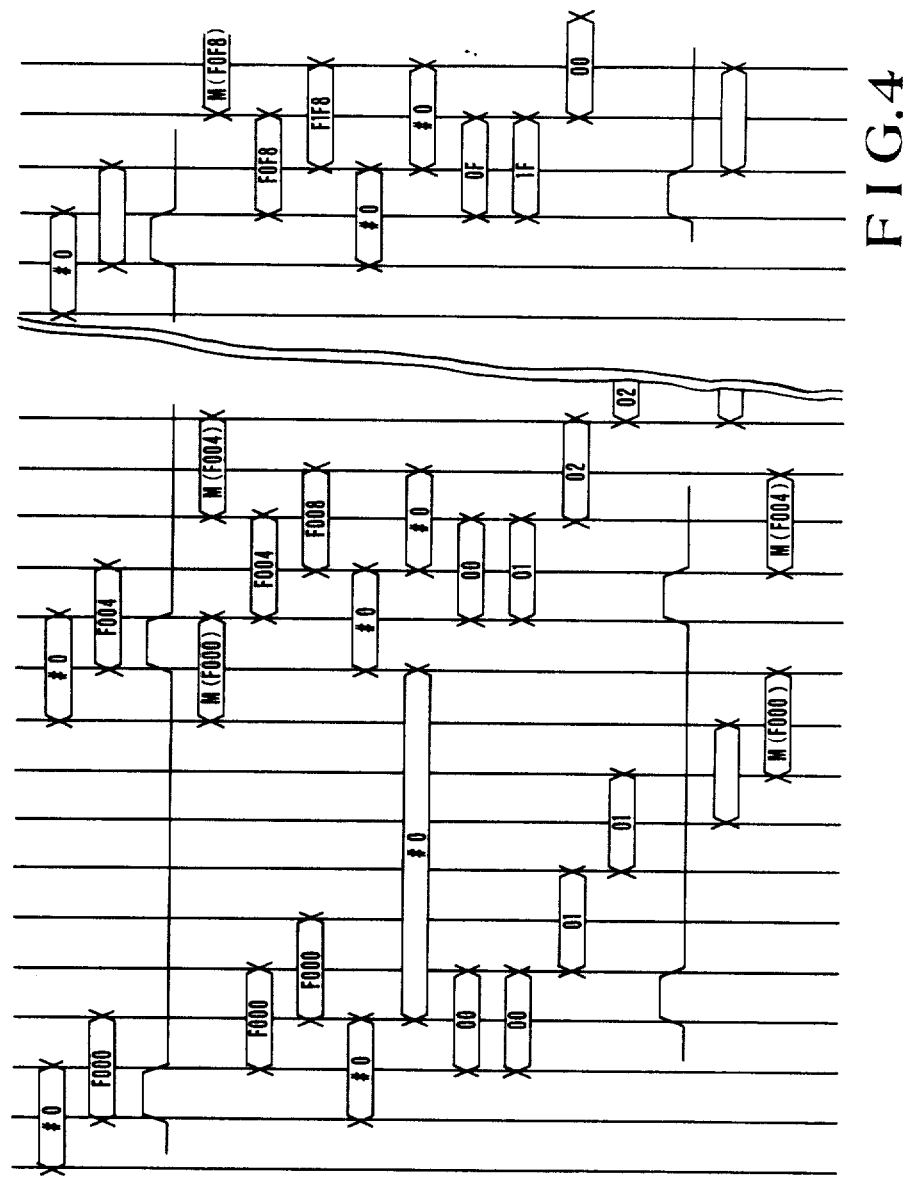

FIG. 4 is a timing chart showing the operation of the registers so as to explain the output operation of the input/output buffer system shown in FIG. 1.

Referring to FIG. 4, prior to data transfer, the input/output processing unit 300 sends a channel number CN(0) through the line 117a and an initialization request signal RQC (FIG. 4) to the buffer system. In response to these signals, the entries of the register files 125 and 134 which correspond to physical channel #0 are cleared, and preparation for data transfer is completed. A signal representing a read address is sent out from the address counter ADC in the input/output processing device 300 to the address buffer register 106 through the line 106a. At the same time, the input/output processing device 300 also sends out a command (not shown) and a memory request signal (not shown).

The buffer system loads the channel number CN in the channel number register 117 and the address in the address buffer register 106. The contents of the channel number register 117 are supplied to the register file 139 through the selector 132, to the register file 125 through the selector 123, and to the register file 134 through the selector 124. The start entry corresponding to the channel number CN is sent from the register file 139 to the base entry register 140, and the corresponding entry size is sent to the size register 141. At the same time, the read relative entry is sent to the read entry pointer 135, and the write relative entry is sent to the write entry pointer 126. In this case, the address buffer register 106 stores data "F000"$_H$ (where H represents the hexadecimal notation), the size register 141 stores data "20"$_H$, the base entry register 140 stores data "00"$_H$, and pointers 126 and 135 store data "00"$_H$ (FIG. 3). The contents of the address buffer register 106 are loaded in the memory address register 103, and thus the read request signal is sent from the buffer system to the main memory 200. At the same time, the contents of the write entry pointer 126 and the base entry register 140 are added by the adder 120. A sum (i.e., "00"$_H$) represents the write entry which is supplied to the write address terminal (WA) in the data area 101 in the buffer memory 100 through the selector 115. As a result, the contents of the address buffer register 106 are written in the entry (i.e., "00"$_H$) designated in the address area 102.

In the next timing, the contents of the channel number register 117 are transferred to the channel number register 118. At the same time, an output from the adder 120 is loaded in the write entry pointer 121 and is transferred to the new write entry pointer 121. An output from the write entry pointer 126 is incremented by one by the adder 127. An output from the adder 127 is written in the area of channel #0 through the selector 129 (the entry in channel #0 of the register file 125 is "01"$_H$). The updated write entry is loaded in the new entry register 130 and is supplied to the terminal WA in the address area 102 through the selector 116. The contents of the memory address register 103 are incremented by 8 (corresponding to two words) by the adder 108. The incremented result is written in the entry (i.e., entry 1) of the address area 102 which is represented by the new write entry pointer 130.

Data read out from the main memory 200 in units of two words is temporarily stored in the memory read data register 104 and written in the entry represented by a signal supplied to the write address terminal DWA in the data area 101. The even-numbered word data (i.e., data at addresses F000 to F003) of the read data is sent to the input/output processing unit 300 through the selectors 112 and 110. However, significant data (i.e., data at addresses F004 to F007) is left as entry 0 in the data area 101. Therefore, entry is channel #0 in the register file 134 for storing a read entry pointer is not updated. In other words, the entry is kept to be "00"$_H$. In this manner, transfer of the first word of the output data is completed. In this case, entry 0 in the address area 102 is "F000"$_H$, entry 1 in the address area 102 is "F008"$_H$, and entry 0 in the data area 101 is 8-byte data at addresses F000 to F007 of the main memory 200. Entry 0 in the register file 125 is kept unchanged as "01"$_H$, and entry 0 in the register file 134 is kept unchanged as "00"$_H$.

When a read request is sent from the input/output processing unit 300 to identical channels (#0), the address data is loaded in the address buffer register 106 in the same manner as described above. The corresponding data signals are loaded in the write entry pointer 126, the read entry pointer 135, the base entry register 140, and the size register 141. In this case, the contents of the address buffer register 106 are not loaded in the memory address register 103. Instead, the outputs from the write entry pointer 126 and the base entry register 140 are added by the adder 120. A sum ("01"$_H$) from the adder 120 is selected by the selector 114. The selected data is sent to the address area 102 through the line 102b, thereby sending the read address from the address area 102 to the memory address register 103. More specifically, data read operation for the data at address F008 of the main memory 200 is requested.

The currently requested data from the input/output processing unit 300 is present as entry 0 of the data area 101. The odd-numbered word data (addresses F004 to F007) in entry 0 of the data area 101 is selected on the basis of the sum of the outputs from the read entry pointer 135 and the base entry register 140. The selected data is loaded in the read data register 107. The loaded data is sent to the input/output processing unit 300 through the selector 110.

An output from the write entry pointer 126 is incremented by one as described above, so that the contents of the register file 126 are updated. The contents of the read entry pointer 135 are incremented by the adder 136 by one, and the incremented data is transferred through the selector 138 to update ("01"$_H$) the contents of the entry corresponding to channel #0 of the register file 134.

Data at addresses F008 to F00F read out from the memory 200 is stored in the memory read data register 104 and is written in an entry ("01"$_H$) represented by the output from the new write entry register 122 in the data area 101. At this moment, transfer of the second word in entry 1 has been completed. Data of two words at addresses F008 to F00F is stored as entry 1 of the data area 101.

Output data transfer is sequentially performed by repeating the above operation. When the write entry pointer from the register file 125 is detected to coincide with the entry size from the size register 141 by means of the comparator 128, the selector 129 selects a fixed value '0'. '0' is set as the contents of the register which correspond to channel #0 of the register file 125. The value of the write entry pointer 130 is updated from "1F"$_H$ to "00"$_H$. The same operation as described above is performed by the comparator 137 and the selector 138 for the register file 134 for storing the read entry pointer 135.

The above description is associated with only channel #0. The same operation as described above is performed for entries "20"$_H$ to "2F"$_H$ for channel #1, and entries "30"$_H$ to "3F"$_H$ for channel #2. The buffer system according to the present invention employs a pipeline control system, and a plurality of physical channels can be multiplexed.

(2) Input Data Transfer

FIG. 5 is a timing chart for explaining transfer operation of the input data in the input/output buffer system shown in FIG. 1. The input/output processing unit 300 clears the buffer areas corresponding to the physical channels subjected to the start of data transfer. The input/output processing unit 300 sends a physical channel number CN to the buffer system. In the next timing, a write address signal is sent through the line 106a, and at the same time write data is sent onto the line 113. In the buffer system, the channel number CN is stored in the channel number register 117, and the corresponding address signal is stored in the address buffer register 106. The pointers, the base entry, and the entry size, all of which correspond to the contents of the channel number register 117, are loaded in the write entry pointer 126, the read entry pointer 135, the base entry register 140, and the size register 141, respectively. The contents of the address buffer register 106 are written in the address area 102 on the basis of a sum ("0") of the adder 120 for adding the outputs from the pointer 126 and the base entry register 140. The corresponding data of the one word from the main memory 200 is written as the even-numbered word (if the address represents an even-numbered word) in the data area 101. The contents of the read entry pointer 135 and the write entry pointer 126 are not updated. One-word transfer of the input/output processing device 300 has been completed. Data is stored in only the buffer memory 100 but is not written in the main memory 200. When data of the second word (i.e., an odd-numbered word) is sent from the input/output processing unit 300, the buffer system writes the write data as the odd-numbered word data in the data area 101. The write entry pointer is incremented by one. The transfer of the second word from the viewpoint of the input/output processing unit 300 has been completed.

Since 2-word data is stored in the data area 101, the buffer system writes the data in the main memory 200. More specifically, the contents of the read entry pointer 135 and the base entry register 140 are added, and data is read out (entry) from the data area 101 on the basis of the sum. The 2-word data is loaded in the memory write data register 105 through the line 105a, and a write request signal is sent to the main memory 200. The output from the read entry pointer 135 is incremented ("01"$_H$) by one, and the increment entry value is used to update the entry corresponding to the physical channel number of the register file 134. The write operation of the first and second words in the main memory 200 has been completed. The next write data is written in entry 1 of the data area 101.

As described above, according to the present invention, the buffer system comprises a means for storing the start position of the buffer area and the buffer size in units of physical channels. Buffer allocation corresponding to the performance of the input/output device connected to each physical channel can be performed. At the same time, a wasteful area is not generated even if the number of physical channels is changed, thereby providing a flexible system. At the time time, the start position and the buffer size are properly changed at the occurrence of a buffer memory failure, thereby providing a highly reliable system.

What is claimed is:

1. An input/output buffer system comprising:
a buffer memory connected between a main memory and an input/output processing unit having a plurality of physical channels, said buffer memory comprising an address area and a data area, all of said address and data areas being assigned to current physical channels, which are currently used, in said plurality of physical channels;
memory means connected to said input/output processing unit for storing start positions and capacities of said areas, which are to be assigned to said current physical channels, of said buffer memory and information relating to said physical channels, said information representing data write and read positions in said areas of said buffer memory by relative values with respect to the start positions of said areas;
means connected to said memory means and said input/output processing unit for presetting in said memory means the start positions and capacities of said areas assigned to said current physical channels when said input/output buffer system is started up or modified; and
logic circuits connected to said buffer memory and said memory means for generating signals representing the data write and read positions for said buffer memory on the basis of a channel number supplied thereto and the start positions, the capacities and the information corresponding to the channel number in order to supply the signals to said buffer memory.

2. A system according to claim 1, wherein said memory means comprises:
a first register file for storing the start positions and capacities of said areas assigned to said current physical channels,
a second register file for storing the information representing the data write positions,
a third register file for storing the information representing the data read positions, and
means for reading from said first, second, and third register files in response to a signal representing the current physical channel number.

3. A system according to claim 2, wherein said logic circuits comprises:
a first adder for adding the data write position and the start position in order to send a sum thereof as a write address to said buffer memory,
a second adder for adding the data read position and the start position in order to send a sum thereof as a read address to said buffer memory,
a third adder for updating contents of said second register file corresponding to the physical channel, on the basis of a value obtained by incrementing the write position by one,
a fourth adder for updating contents of said third register file corresponding to the physical channel, on the basis of a value obtained by incrementing the read position by one,
first and second comparators for comparing outputs from said third and fourth adders with the capacity corresponding to the physical channel in order to set contents of said second and third register files corresponding to the physical channel to be zero when the outputs from said third and fourth adders coincide with each other, and means for sending the output from said third adder as updated write position information to said address area in said buffer memory.

4. A system according to claims 2, wherein said presetting means comprises:
   a firmware write bus for transferring the start position, capacity and the channel number from said input/output processing unit to said first register file,
   a register for storing the channel number sent from said input/output processing unit through said firmware write bus, and
   selector means for selectively supplying to said first register file the channel number output from said register or the channel number supplied from said input/output processing unit in an actual input/output operation.

5. An input/output buffer system connected between a main memory and an input/output processing unit having a plurality of physical channels, comprising:
   a buffer memory consisting of an address area and a data area all of which are assigned to current physical channels, which are currently used, in said plurality of physical channels;
   memory means for storing start positions and capacities of said areas, which are to be assigned to said current physical channels, of said buffer memory and information relating to said physical channels, said information representing data write and read positions in said areas of said buffer memory by relative values with respect to the start positions of said areas and the start positions and capacities being preset in said memory means when said input/output buffer system is started up or modified;
   readout means for reading out contents of said memory means according to a physical channel number supplied from said input/output processing unit;
   a first adder or adding the start position and the data write position respectively read out by said readout means;
   a second adder for adding the start position and the data read position respectively read out by said readout means;
   a third adder for incrementing the data write position stored in said memory means by one;
   a fourth adder for incrementing the data read position stored in said memory means by one;
   first selecting means for comparing an output from said third adder with an assigned capacity in order to output the output from said third adder when a coincidence is not established and to output '0' when a coincidence is established, thereby to update the data write position of said buffer memory every time a write operation is performed; and
   second selecting means for comparing an output from said fourth adder with the assigned capacity in order to output the output from said fourth adder when a coincidence is not established and to output '0' when a coincidence is established, thereby to update the data read position every time a read operation is performed;
   wherein, in an input data transfer mode, a memory address and write data sent from said input/output processing unit are written in a buffer memory position designated by an output from said second adder to be written in said main memory on the basis of the memory address, and, in an output data transfer mode, data are continuously read out from said main memory on the basis of a memory address sent from said input/output processing unit, a main memory address and the readout data are written in a buffer memory position designated by the output from said first adder, and data are read from the buffer memory position designated by the output from said second adder in order to be sent to said input/output processing unit.

* * * * *